(12) United States Patent
Takahashi et al.

(10) Patent No.: US 11,554,420 B2
(45) Date of Patent: Jan. 17, 2023

(54) THREADING DEVICE AND THREADING METHOD

(71) Applicants: CITIZEN WATCH CO., LTD., Nishitokyo (JP); CITIZEN MACHINERY CO., LTD., Nagano (JP)

(72) Inventors: Hikaru Takahashi, Komoro (JP); Tamotsu Katsuta, Nagano (JP)

(73) Assignees: CITIZEN WATCH CO., LTD., Nishitokyo (JP); CITIZEN MACHINERY CO., LTD., Nagano (JP)

( * ) Notice: Subject to any disclaimer, the term of this patent is extended or adjusted under 35 U.S.C. 154(b) by 344 days.

(21) Appl. No.: 16/613,451

(22) PCT Filed: Jun. 21, 2018

(86) PCT No.: PCT/JP2018/023581
§ 371 (c)(1),
(2) Date: Nov. 14, 2019

(87) PCT Pub. No.: WO2019/012937
PCT Pub. Date: Jan. 17, 2019

(65) Prior Publication Data
US 2020/0338644 A1  Oct. 29, 2020

(30) Foreign Application Priority Data
Jul. 13, 2017  (JP) .............................. JP2017-137346

(51) Int. Cl.
*B23B 5/46*   (2006.01)
*B23G 3/00*   (2006.01)
*B23Q 15/013*  (2006.01)

(52) U.S. Cl.
CPC .................. *B23B 5/46* (2013.01); *B23G 3/00* (2013.01); *B23Q 15/013* (2013.01)

(58) Field of Classification Search
CPC ........... B23B 29/125; B23B 5/46; B23G 3/00; B23G 1/04; B23G 2240/36; B24B 1/04;
(Continued)

(56) References Cited

U.S. PATENT DOCUMENTS 4,025,764 A  *  5/1977  Tack .................... B23Q 15/013
451/5
4,583,433 A  *  4/1986  Nozawa ............... B23Q 15/013
82/1.11
(Continued)

FOREIGN PATENT DOCUMENTS

CN    1758981 A    4/2006
JP    S5639821 A   4/1981
(Continued)

OTHER PUBLICATIONS

Machine Translation of IDS provided prior art JP59-039250 (Year: 2022).*
(Continued)

*Primary Examiner* — Nicole N Ramos
(74) *Attorney, Agent, or Firm* — Kenja IP Law PC

(57) ABSTRACT

Disclosed are threading device and threading method, including a turning step for threading a rotating workpiece with a predetermined cutting depth, by relatively moving a tool in the axial direction of the workpiece and then rounding-up the workpiece obliquely by relatively moving the tool in the axial direction and radially outward. The workpiece is subjected to the threading process by repeatedly carrying out the turning step while sequentially shifting the axial position for starting the rounding-up of the workpiece relative to an
(Continued)

axial position where the rounding-up of the workpiece has been started in a previous turning step.

6 Claims, 4 Drawing Sheets

(58) Field of Classification Search
CPC ..... Y10T 82/20; Y10T 82/904; B23Q 15/013; B23Q 15/14
See application file for complete search history.

(56) References Cited

U.S. PATENT DOCUMENTS

| | | | | |
|---|---|---|---|---|
| 5,778,745 | A * | 7/1998 | Furusawa | B23B 25/02 451/28 |
| 5,868,051 | A * | 2/1999 | Pakos | B23G 3/04 470/81 |
| 7,216,571 | B2 * | 5/2007 | Schreiber | B23B 1/00 407/69 |
| 9,122,257 | B2 * | 9/2015 | Ueno | G05B 15/02 |
| 10,155,268 | B2 * | 12/2018 | Takashima | B23B 27/06 |
| 10,625,355 | B2 * | 4/2020 | Watanabe | B23G 3/08 |
| 2006/0047357 | A1 * | 3/2006 | Tanaka | G05B 19/186 700/173 |
| 2011/0218666 | A1 * | 9/2011 | Sugie | G05B 19/182 700/160 |
| 2014/0102268 | A1 * | 4/2014 | Hariki | B23Q 5/28 82/117 |
| 2014/0141896 | A1 * | 5/2014 | Shimizu | B23G 1/02 470/1 |
| 2015/0346707 | A1 * | 12/2015 | Haga | G05B 19/182 700/160 |
| 2018/0318948 | A1 * | 11/2018 | Michiwaki | B23G 1/00 |

FOREIGN PATENT DOCUMENTS

| | | |
|---|---|---|
| JP | S5939250 B2 | 9/1984 |
| JP | 2010247246 A | 11/2010 |
| JP | 5937891 B2 | 6/2016 |
| JP | 2017102630 A | 6/2017 |
| KR | 1019930002407 B1 | 3/1993 |
| TW | 144257 | 10/1990 |
| WO | 2016056526 A1 | 4/2016 |
| WO | 2016067371 A1 | 5/2016 |

OTHER PUBLICATIONS

Feb. 28, 2022, Office Action issued by the Korean Intellectual Property Office in the corresponding Korean Patent Application No. 10-2019-7034024.
Jun. 18, 2021, Office Action issued by the Taiwan Intellectual Property Office in the corresponding Taiwanese Patent Application No. 107123094.
Mar. 12, 2021, the Extended European Search Report issued by the European Patent Office in the corresponding European Patent Application No. 18832469.3.
Luke Berglind et al., Modulated Tool Path (MTP) Machining for Threading Applications, Procedia Manufacturing, 2015, pp. 546-555, vol. 1.
Oct. 9, 2020, Office Action issued by the China National Intellectual Property Administration in the corresponding Chinese Patent Application No. 201880032289.1.
Sep. 25, 2018, International Search Report issued in the International Patent Application No. PCT/JP2018/023851.
Jan. 14, 2020, International Preliminary Reporton Patentability issued in the International Patent Application No. PCT/JP2018/023581.
Oct. 25, 2021, Office Action issued by the China National Intellectual Property Administration in the corresponding Chinese Patent Application No. 201880032289.1.

* cited by examiner

THREADING DEVICE AND THREADING METHOD

TECHNICAL FIELD

This disclosure relates to a threading device and a threading method for forming a thread groove in a workpiece.

BACKGROUND

As a threading device or threading method for forming a thread groove in a workpiece, a threading device or a threading method for forming a thread on a workpiece is known wherein a workpiece fixed to a main spindle of a lathe is rotated with the main spindle and an outer peripheral surface of the workpiece is subjected to a spiral turning by means of a tool that is moved in an axial direction relative to the workpiece, with a cutting depth that is shallower than the bottom of the thread, and the turning is repeatedly carried out over the entire range of the workpiece in the axial direction that requires threading, while gradually increasing the cutting depth (see, for example, Patent Literatures PTL 1 and PTL 2).

CITATION LIST

Patent Literature

PTL 1: JP 5937891 B2
PTL 2: JPS 59-39250 B2

SUMMARY

Technical Problem

In the conventional threading device or threading method described above, in each of the repeated turning operations, the workpiece is turned continuously over the entire range in the axial direction where the workpiece needs to be threaded. Thus, a risk of such problem tends to occur that, if the length of the thread to be formed becomes long to some extent, the chips generated during the cutting process will also become long, and the chips may get entangled with the tool, or the surface of the work may be damaged by the chips.

The present disclosure has been made in view of the above problems, and an object thereof is to provide a threading device and a threading method capable of carrying out threading while breaking the chips.

Solution to Problem

According to the present disclosure, there is provided a threading device comprising a spindle for rotatably supporting the workpiece, and a control unit for controlling a relative movement of a tool with respect to the workpiece, wherein the control unit controls the movement of the workpiece and the tool in accordance with a predetermined turning step: wherein the turning step is defined to be carried out by relatively moving the tool in the axial direction of the workpiece to subject the rotating workpiece to cutting with a predetermined cutting depth, and then relatively moving the rotating workpiece in the axial direction and radially outward to subject the workpiece to rounding-up obliquely; and wherein the control unit controls the turning step to be carried out repeatedly, while sequentially shifting an axial position for starting the rounding-up of the workpiece relative to an axial position where the rounding-up has been started in a previous turning step, thereby forming a thread groove in the workpiece.

In the threading device according to the present disclosure, with the above-described configuration, it is preferred that the predetermined cutting depth of the tool with respect to the workpiece is a depth corresponding to a thread bottom of a thread formed on the workpiece.

In the threading device according to the present disclosure, with the above-described configuration, it is preferred that a deburring process is carried out after the thread groove has been formed in the workpiece, in which at least a part of a top of a first thread in the workpiece is cut by the tool.

In the threading device according to the present disclosure, with the above-described configuration, it is preferred that the deburring step is defined to be carried out by relatively moving the tool in the axial direction of the workpiece to cut the top of the thread in the rotating workpiece with a predetermined cutting depth and then relatively moving the tool in the axial direction and radially outward to subject the top of the thread to rounding-up obliquely, and the control unit controls the deburring step to be carried out repeatedly, while sequentially shifting an axial position for starting the rounding-up of the top of the thread in the workpiece relative to an axial position where the rounding-up of the top of the thread has been started in a previous deburring step, thereby cutting at least a part of a top of the thread in the workpiece.

According to the present disclosure, there is further provided a threading method for forming a thread groove in a workpiece, comprising:

a turning step carried out by relatively moving the tool in the axial direction of the workpiece to subject the rotating workpiece to cutting with a predetermined cutting depth, and then relatively moving the rotating workpiece in the axial direction and radially outward to subject the workpiece to rounding-up obliquely, wherein the turning step is carried out repeatedly by sequentially shifting an axial position for starting the rounding-up of the workpiece relative to an axial position where the rounding-up has been started in a previous turning step, thereby forming a thread groove in the workpiece.

In the threading method according to the present disclosure, with the above-described configuration, it is preferred that the predetermined cutting depth of the tool with respect to the workpiece is a depth that corresponds to a thread bottom of a thread to be formed in the workpiece.

In the threading method according to the present disclosure, with the above-described configuration, it is preferred that the method further comprises a deburring step to be carried out after the thread groove has been formed in the workpiece, for cutting at least a part of the top of the first thread of the workpiece with a tool.

In the threading method according to the present disclosure, with the above-described configuration, it is preferred that the deburring step, in which the tool is relatively moved in the axial direction of the workpiece to cut the top of the thread in the rotating workpiece with a predetermined cutting depth and then the tool is relatively moved in the axial direction and radially outward to subject the top of the thread to rounding-up obliquely, is carried out repeatedly while sequentially shifting an axial position for starting the cutting of the top of the thread in the workpiece relative to an axial position where the cutting of the top of the thread was started in a previous deburring step, thereby cutting at least a part of a top of the thread in the workpiece.

Advantageous Effect

According to the present disclosure, it is possible to provide a threading device and a threading method capable of carrying out threading while breaking the chips.

DETAILED DESCRIPTION

A threading device 1 according to an embodiment of the present disclosure includes a main spindle 2 that rotatably supports a workpiece W, and a control unit 4 that controls relative movement of the tool 3 with respect to the workpiece W. The control unit 4 serves to control the movement of the workpiece W and the tool 3 in accordance with a predetermined turning step to form a thread groove is formed in the workpiece W. The threading device 1 may be configured, for example, as a lathe. By using the threading device 1, the threading method according to one embodiment of the present disclosure given below can be performed with respect to the workpiece W.

Figure 1:
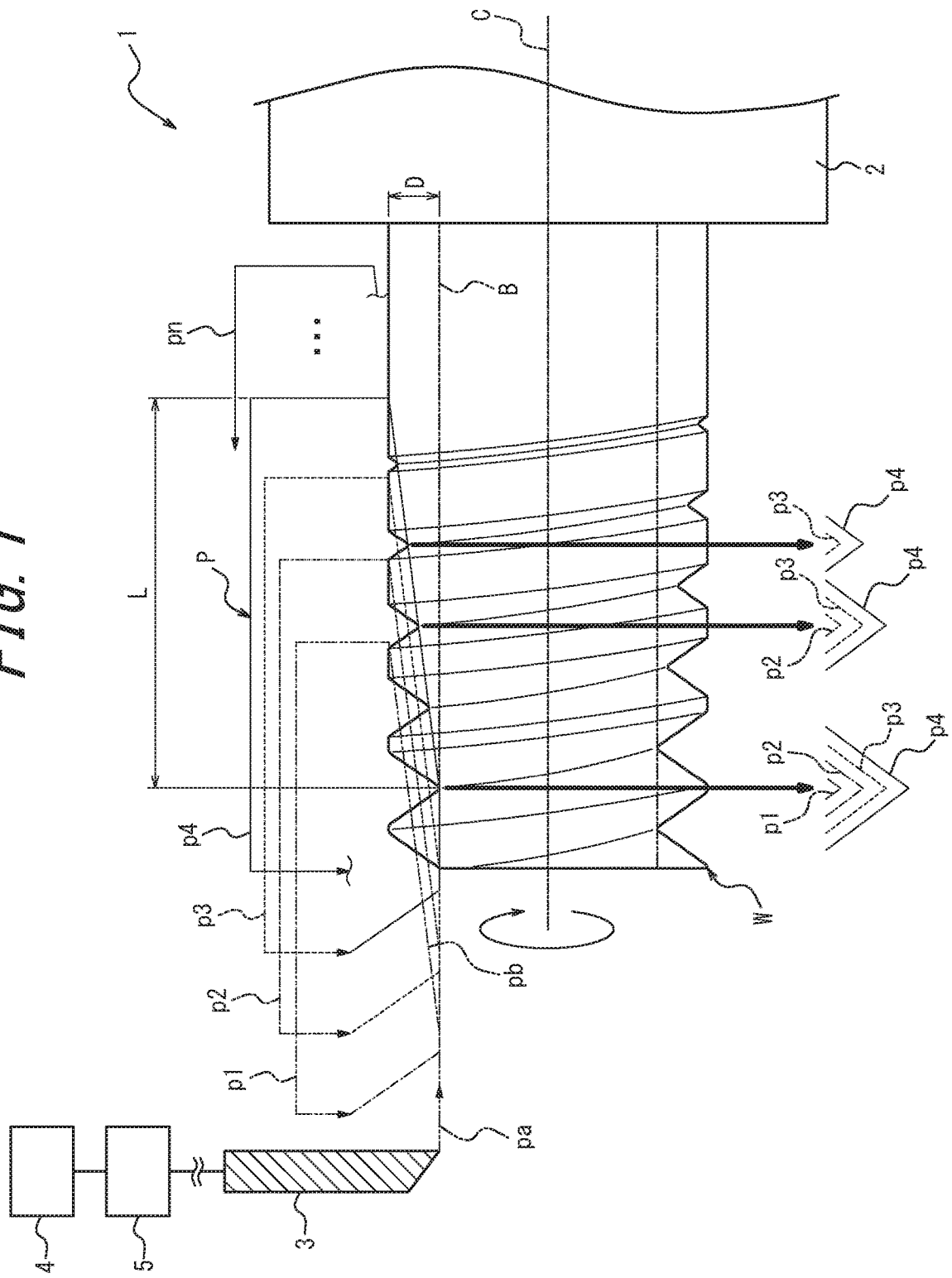
FIG. 1 is explanatory view illustrating the concept of the threading method using the threading device according to one embodiment of the present disclosure.

As illustrated in FIG. 1, as the workpiece W, for example, there may be used a member formed of a metal material such as a steel material with a rod shape having a circular cross section.

The workpiece W is fixed coaxially to the spindle 2 that can rotate the workpiece W of the threading device 1 by a clamp means such as a chuck (not shown) so as to be movable in the axial direction (Z-axis direction) and driven into rotation by the spindle 2 about the rotation center axis C.

The tool 3 can be driven by the drive mechanism 5 and automatically moved relative to the workpiece W in the axial direction (Z-axis direction) and the radial direction (X-axis direction). In FIG. 1, the shape of the tool 3 is illustrated schematically. As the tool 3, there is used a tool having a cutting edge portion having a shape corresponding to the thread groove of the thread to be formed.

The control of rotation of the main spindle 2 and operation of the tool 3 is carried out by the control unit 4.

In the present embodiment, an example will be described in which the threading is performed by moving the tool 3 with respect to the workpiece W. The thread cutting apparatus 1 according to the present embodiment controls the operation of the tool 3 (drive mechanism 5) by the control unit 4 to move the cutting edge portion of the tool 3 along the tool path P illustrated in FIG. 1 such that the outer peripheral surface of the workpiece W rotated by the main spindle 2 is subjected to threading under predetermined threading conditions (pitch interval, depth of cut, etc.).

The tool path P indicates a movement path when the tool 3 carries out threading with respect to the workpiece W. The tool path P in the present embodiment has a plurality of sub-paths p1 to pn (n is a natural number) corresponding to the moving path of the tool 3 for gradually advancing machining from an axial cutting position of the workpiece W toward a dimensional position of the thread bottom B, as in the conventional threading process. FIG. 1 exemplarily shows four sub-paths p1 to p4 as an intermediate state of the threading process along the tool path P. In the four sub-paths p1 to p4, the cutting edge portion of the tool 3 is moved so that the threading process proceeds in the order of the sub-path p1, the sub-path p2, the sub-path p3, the sub-path p4.

The sub-path p1 includes a cutting path pa for moving the cutting edge portion of the tool 3 with respect to the workpiece W, from the distal end side of the workpiece W toward the proximal end side (the main spindle 2 side), at a radial position where a predetermined (constant) cutting depth D is obtained, and an inclined round-up path pb that is continuous with the cutting path pa on the side of the main spindle 2, for moving the cutting edge portion of the tool 3 with respect to the workpiece W in the axial direction, in the axial direction toward the side of the main spindle 2 and also outward in the radial direction. In the present embodiment, the predetermined cutting depth D of the tool 3 with respect to the workpiece W is a depth corresponding to the thread bottom B of the thread to be formed on the workpiece W. The tool 3 can be moved along the cutting path pa to cut the workpiece W with the predetermined cutting depth D, and further moved along the cutting path pb on the outer periphery of the rotating workpiece W under predetermined threading conditions so as to form a thread groove by turning while obliquely rounding-up. The machining length in the axial direction on which the turning process is carried out by the tool 3 moving on the sub path p1 is set to be shorter than the one-time machining length in the axial direction by the conventional threading process.

When the turning process of the workpiece W by means of the tool 3 moving along the sub-path p1 is completed, the tool 3 is moved radially outward from the outer peripheral surface of the workpiece W, and then moved away from the main spindle 2 along the axial direction and along the sub-path p2 that is shifted from the sub-path p1 toward the main spindle 2 to carry out a next turning process for the workpiece W.

The sub-path p2 also includes a cutting path with the same cutting depth D and the same axial length as the cutting path pa of the sub-path p1, and a round-up path having the same inclination angle and the same axial length as the round-up path pb of the sub-path p1. The sub-path p2 Is shifted in the axial direction by a predetermined distance toward the main spindle 2 with respect to the auxiliary path p1 along which that previous turning step has been carried out, such that the axial position for starting rounding-up of the workpiece W in the previous turning step by the tool 3 (the axial position where the round-up path starts) is located between the axial position where the rounding-up of the workpiece W has been started in the previous turning step by means of the tool 3 moved along the sub-path p1 (axial position where the round-up path starts), and the axial position where the rounding-up of the workpiece W has been completed (the axial position where the round-up path pb terminates). In the turning process of the workpiece W by means of the tool 3 moving along the sub-path p2, the cutting process for cutting the workpiece W with a constant cutting depth D is started from a position closer to the side of the main spindle 2 than the axial position where the cutting process has been started in the previous turning process, and the rounding-up step for rounding-up the workpiece W is started from a position between the axial position where the rounding-up of the workpiece W has been started and the axial position where the rounding-up has been completed in the previous turning process.

When the turning process by the tool 3 moving along the sub path p2 is completed, the tool 3 is moved again in the direction away from the main spindle 2 along the axial direction to perform the next turning process, and moved along the sub-path p3 that is shifted toward the side of the main spindle 2 from the previous sub-path p2, to carry out the next turning process on the workpiece W. The sub-path p3 also includes a cutting path of the same cutting depth and axial length as the cutting path pa of the sub-path p1 and the sub-path p2, and a round-up path having an axial length of the same inclination angle and axial length as the round-up path pb of the sub-path p1 and the sub-path p2. In the turning process of the workpiece W by the tool 3 moving along the sub path p3 also, the cutting process for cutting the workpiece W with the predetermined cutting depth D is started from a position closer to the main spindle 2 than the axial position where the cutting process has been started in the previous turning process along the sub path p2, and the rounding-up process for rounding-up the workpiece W is started from a position between the axial position where the rounding-up of the workpiece W has been started and the axial position where the rounding-up has been completed in the previous turning process.

Similarly, the movement paths of the tool 3 are set in the order of the sub-path p4 . . . sub-path pn, such that the axial position for starting rounding-up of the workpiece W is shifted between the axial position where the rounding-up of the workpiece W has been started and the axial position where the rounding-up of the workpiece W has been completed in the previous turning step, and the axial position where the rounding-up of the workpiece W has been completed. The outer peripheral surface of the workpiece W is subjected to gradual threading by repeatedly carrying out the turning process while sequentially changing the axial position for starting rounding-up of the workpiece W with respect to the axial position where the rounding-up of the workpiece W has been started in the previous turning step.

When starting the next turning process along each of the sub-paths p2 to pn, the controller 4 carries out a control so as to synchronize the rotation of the main spindle 2 and the phase of the cutting start position with respect to the tool 3 on the workpiece W. The tool 3 is forced into the thread groove with a predetermined cutting depth along the cut portion of the workpiece W that has been cut in the previous turning step, and reaches the unmachined portion to carry out cutting and rounding-up of the workpiece W from that position continuously to the previous turning step.

As the threading step along each of the sub-paths p1 to pn proceeds, the cutting position becomes closer to the position of the thread bottom B, and the workpiece W is finished along the predetermined sub-path pn (p3 in this embodiment) to the depth reaching the thread bottom B at the end face of the workpiece W. In each of the sub-paths p1 to pn, the cutting depth of the tool 3 into the workpiece W in the rounding-up process is the distance between the previous round-up path and the next round-up path.

As indicated by the leftmost arrow in FIG. 1, the thread groove is gradually formed deeper in the part where the workpiece W has been turned by the tool 3 in the order of the sub-paths p1 to p4. In the example of the leftmost arrow in FIG. 1, the threading conditions are such that the desired thread bottom B is reached in the sub-path p4, so that the workpiece W is finished by the turning process of the secondary path p4, into a thread having the thread bottom B. As indicated by the second arrow from the left in FIG. 1, in the part where only the three turning steps of the workpiece W along the sub-paths p2 to p4 have been completed, the thread groove has gradually increasing depth after the tool 3 has passed through in the order of the sub-paths p2 to p4 of the workpiece W, though the thread bottom B is still not reached, so that the thread is finished by carrying out the next turning process. As indicated by the rightmost arrow in FIG. 1, in the part of the workpiece W where the turning process has been completed only along the sub-paths p3 and p4, the tool is passed in the order of the sub-paths p3 and p4 and the thread groove is made gradually deeper, though it is still in a shallow state, and the thread is finished by carrying out two further turning steps. When the prescribed number of turning steps have been carried out, the threading process is completed, and a desired thread groove is formed on the outer peripheral surface of the workpiece W.

In the threading method by the threading device 1 described above, the machining length of the turning process in the axial direction carried out by the tool 3 moving along each of the sub-paths p1 to pn is in any case smaller than the threading dimension of the workpiece W. Therefore, in each turning process carried out by the tool 3 moving along the sub-paths p1 to pn, chips generated during turning of the workpiece W by the tool 3 are segmented each time the respective turning step is completed, so as to be shorter than the chips generated in the conventional threading process with the same length as the threading dimension of the workpiece W. It is thus possible to shorten the chips generated by the threading process and prevent the chips from being entangled with the tool 3, or the surface of the workpiece W from being damaged by the chips. Further, it is possible to carry out elongated thread cutting while shortening the chips. Furthermore, it is possible to prevent bending or chattering of the workpiece, thereby allowing highly accurate threading.

During the turning process carried out by the tool 3 moving along each of the sub-paths p1 to pn, in particular along the sub-path pn after the cutting position reached the thread bottom B position, the first half of the cutting step by the tool 3 that moves along the cutting path is a zero-cut machining of the part of the tool path P that has been once machined, so that the threading of the workpiece W is carried out after the zero-cutting. Thus, any remaining unmachined part is removed by this zero-cutting, thereby allowing the threading to be carried out without forming any steps in the thread groove.

By changing the rounding angle of the rounding path pb in each of the secondary paths p1 to pn, it is possible to change the axial length L of the rounding path pb, or to adjust the number of turning steps required to complete the threading process.

Figure 2:
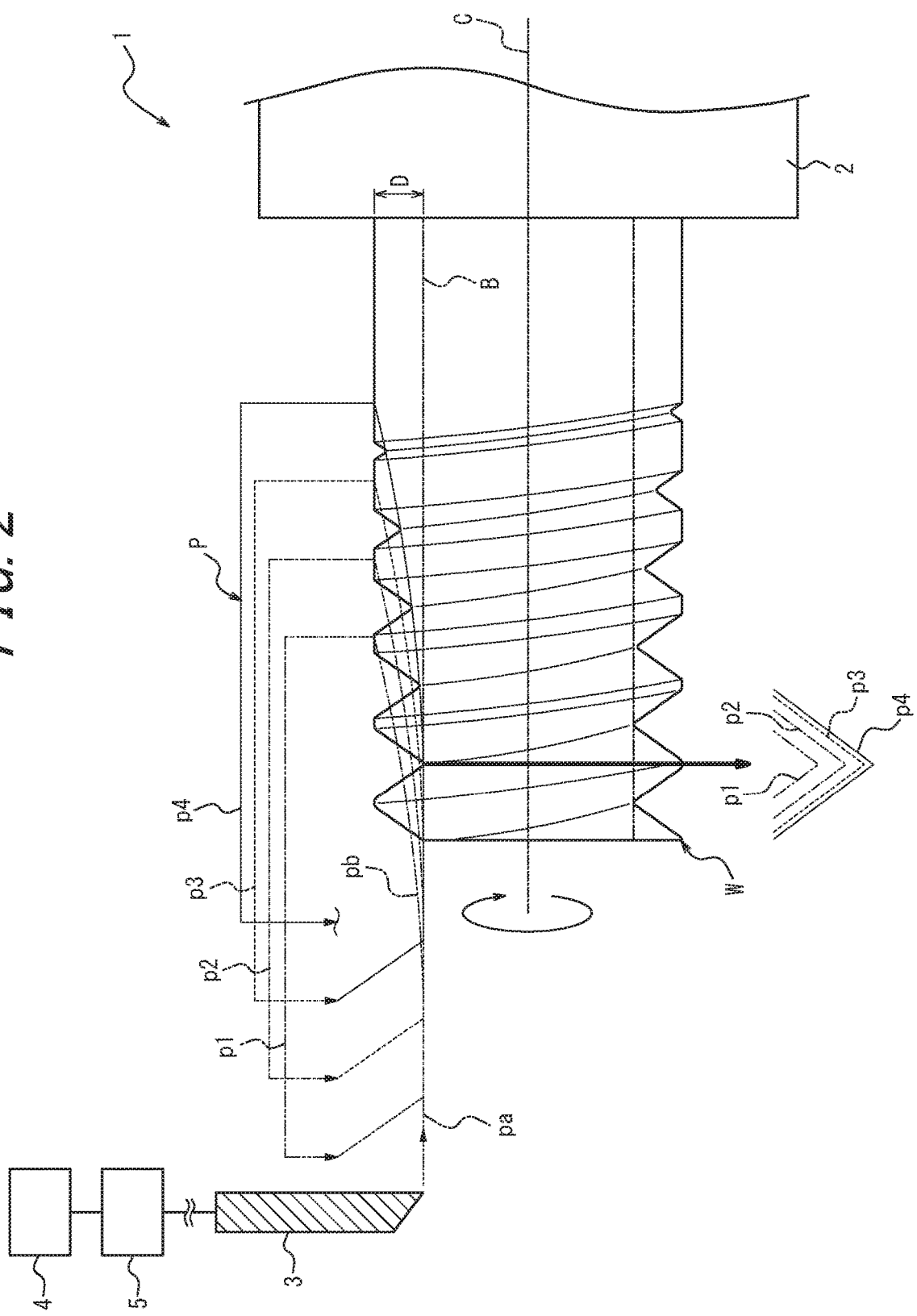
FIG. 2 is explanatory view illustrating one modification of the threading device and threading method illustrated in FIG. 1.

FIG. 2 is an explanatory view illustrating a modification of the threading device and the threading method illustrated in FIG. 1. In FIG. 2, members or paths corresponding to the members or paths described above are denoted by the same reference numerals.

In the case illustrated in FIG. 1, the round-up path pb in each of the sub-paths p1 to pn is designed a straight line. However, as illustrated in FIG. 2, the round-up path pb in each of the sub-paths p1 to pn may be designed as a curve. By designing the round-up path pb in each of the sub-paths p1 to pn as a curve, as indicated by an arrow in FIG. 2, the cutting depth of the tool 3 into the workpiece W required for machining one thread can be made different for each path p1 to p4 such that the cutting depth into the workpiece W in the first sub-path p1 is the largest, the cutting depth into the workpiece W is gradually decreased as the cutting proceeds along the sub-paths p2, p3, and the cutting depth into the workpiece W is minimized in the sub-path p4. In this case, since the cutting depth of the sub-path p4 that is the final finish of the thread can be minimized, the cutting resistance can be reduced thereby allowing highly accurate finishing of the thread.

When designing the round-up path pb in each of the sub-paths p1 to pn as a curve, the round-up path pb may be designed as a variety of curves, such as parabolic shape or arc shape.

Figure 3:
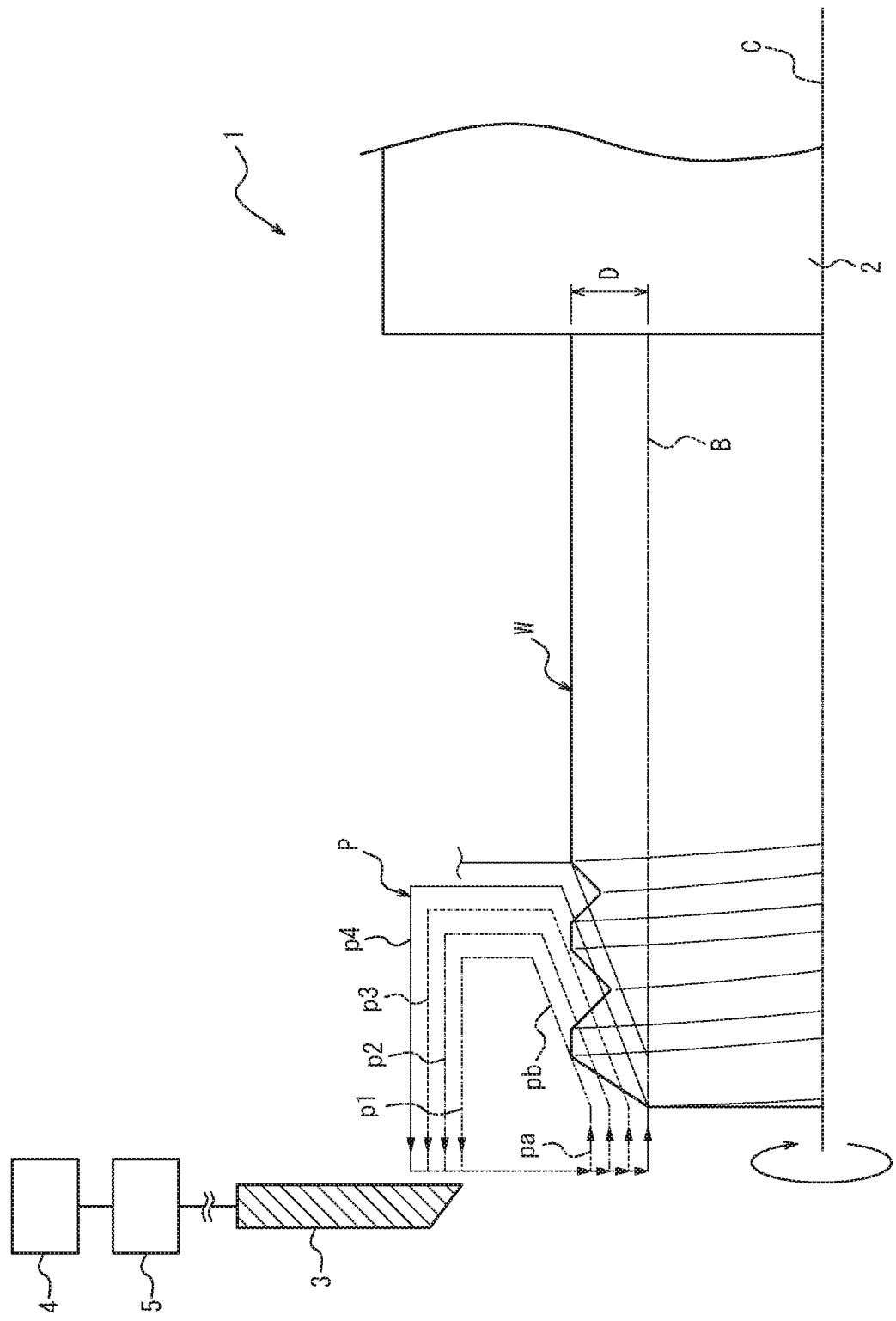
FIG. 3 is explanatory view illustrating another modification of the threading device and threading method illustrated in FIG. 1.

FIG. 3 is an explanatory view illustrating another modification of the threading device and the threading method illustrated in FIG. 1. In FIG. 3 also, the same reference numerals are assigned to members or paths corresponding to the members or paths described above.

In the case illustrated in FIG. 1, the sub-paths p1 to pn are determined such that the axial position for starting the rounding-up of the workpiece 3 by the tool 3 is changed in the axial direction relative to the axial position where the rounding-up of the workpiece W has been started in the previous turning process. However, as illustrated in FIG. 3, the sub-paths p1 to p4 may be determined such that, instead of changing the axial position for starting the rounding-up of the workpiece W by the tool 3, the radial position for starting the rounding-up of the workpiece W by the tool 3 is sequentially changed toward radially inside relative to the radial position where the rounding-up of the workpiece W has been started in the previous turning process. In particular, by adopting the above-described configuration within the range in which the tool 3 turns the end portion of the workpiece W, the tool 3 may be moved at a position closer to the end portion of the workpiece W than the case illustrated in FIG. 1 to carry out turning of the end portion of the workpiece W. After the end portion of the tool 3 workpiece W has been turned by moving the tool 3 along the sub-paths p1 to p4, the subsequent turning process may be repeatedly carried out such that the axial position for starting the rounding-up of the workpiece 3 by the tool 3 is changed in the axial direction relative to the axial position where the rounding-up of the workpiece W has been started in the previous turning process, as illustrated in FIG. 1, or may be carried out by sequentially shifting the sub-paths p1 to p4 as illustrated in FIG. 3.

FIGS. 4A to 4D are explanatory views illustrating the procedure of a deburring process by means of a tool.

The threading device 1 or the threading method according to the present embodiment may be configured so as to carry out a deburring step after the desired thread groove has been formed on the outer peripheral surface of the workpiece W by the above method, to thereby cut at least part of the peak portion of the first thread formed on the outer peripheral surface of the workpiece W by the tool 3. In the deburring process, by cutting at least part of the top of the thread, burrs generated in the threading process at the top of the first thread can be removed to improve the shape of the thread.

The first thread described above refers to a thread for one turn of the outer peripheral surface of the work W that is formed first when the thread groove on the outer peripheral surface of the work W is cut from one end side in the axial direction.

The deburring process described above may be carried out, for example, by controlling the movement of the tool 3 by means of the control unit 4 while rotating the workpiece W relative to the tool 3, thereby moving the tool 3 along the tool paths illustrated in FIGS. 4A to 4D.

Figure 4A:
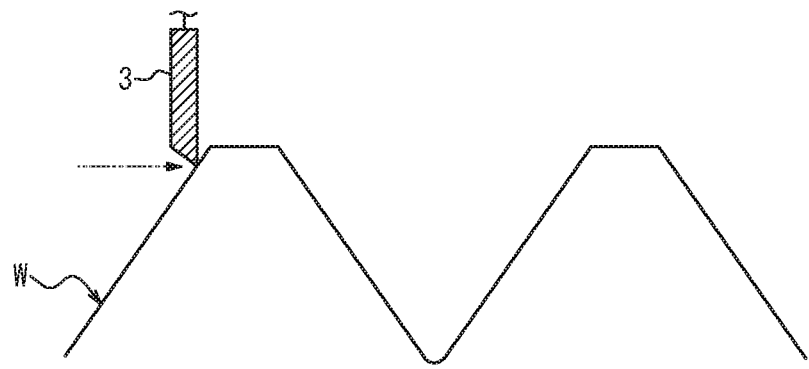
FIGS. 4A-4D are explanatory views illustrating the procedure of the deburring process by the tool.
Figure 4B:
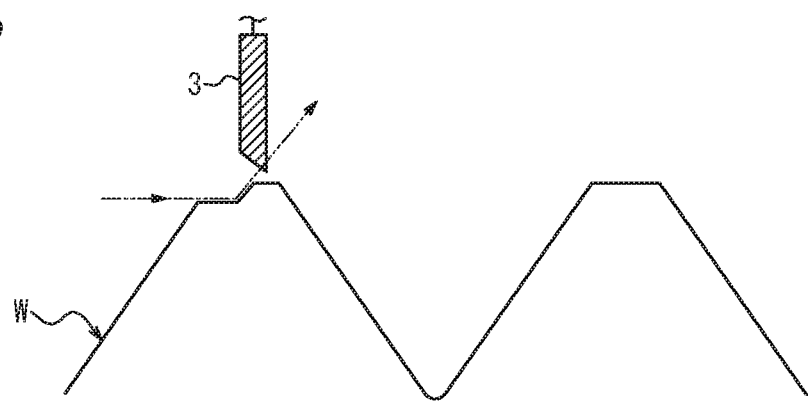
Figure 4C:
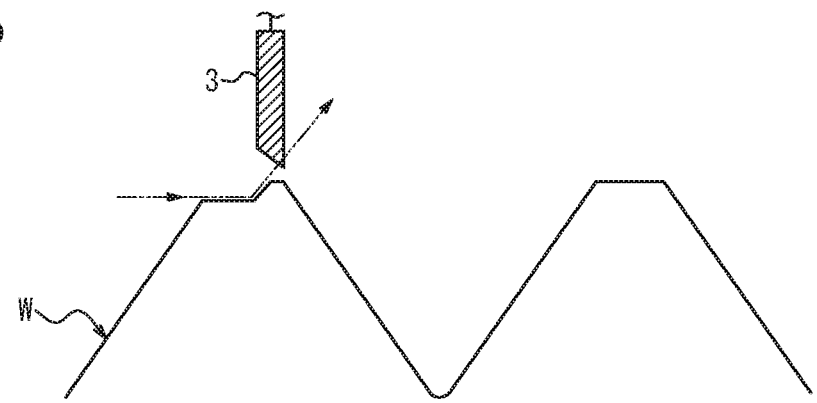
Figure 4D:
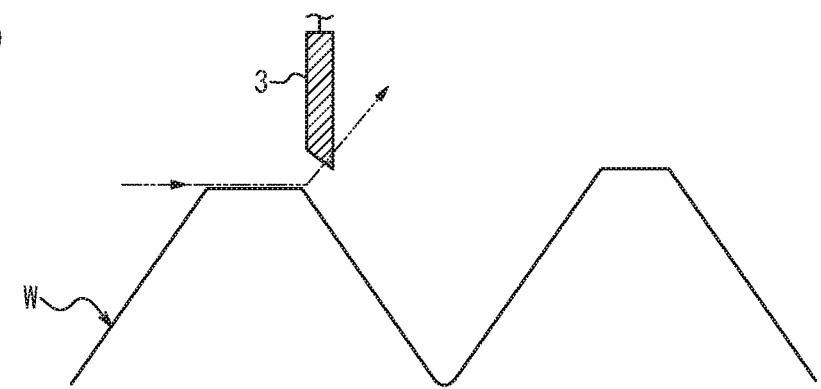

That is, as illustrated in FIG. 4A, the tool 3 is moved relative to the workpiece W in the axial direction and forced into the top of the first thread of the rotating workpiece W with a predetermined cutting depth. As illustrated in FIG. 4B, the tool 3 is then relatively moved in the axial direction and outward in the radial direction, that is, the tool 3 is moved along the inclined round-up path, to diagonally round-up part of the top of the thread by the tool 3. After subsequently moving the tool 3 outward in the radial direction from the outer peripheral surface of the workpiece W and moving it in the direction away from the main spindle 2 along the axial direction, the tool 3 is forced into the remaining part of the top of the first thread of the rotating workpiece W with the same cutting depth as in the previous deburring step. Then, as illustrated in FIG. 4C, at the axial position shifted toward the main spindle 2 with respect to the axial position where the rounding-up of the thread has been started in the previous deburring step, the tool 3 is moved axially and radially outward to carry out rounding-up of the top of the thread on the side closer to the main spindle 2 than in the previous deburring step. Similarly, after returning the tool 3 to the initial position where the deburring step has been started, the remaining part of the top of the first thread is cut in the axial direction with the same cutting depth as the previous deburring step, and the positions for starting the rounding-up of the top of the first thread are sequentially shifted toward the side of the main spindle 2 relative to the axial position where the rounding-up of the top of the thread has been started in the previous deburring step, thereby cutting the top of the thread to remove the burrs, as illustrated in FIG. 4D.

In the deburring step, although it is preferred to remove all of the top of the first thread with the tool 3, in the case where burrs are generated only in a part of the first thread, only that part of the top of at least the first thread may be removed. Further, not only the top of the first thread, but also the tops of the second and subsequent threads may be subjected to removal.

The deburring process is not limited to the method carried out by moving the tool 3 as described above, and various methods may be adopted as long as at least part of the top of the first thread can be cut, for example, by using a tool such as a grooving tool, and moving it in the axial direction with a constant depth of cut for cutting the entire top of the thread using a tool.

The present disclosure is not limited to the embodiment described above, and various modifications may be made without departing from the scope of the invention.

In the embodiment described above, the predetermined cutting depth D for cutting the workpiece by the tool 3 moving along the cutting path pa is set to a depth corresponding to the thread bottom B. However, the depth may be shallower than the thread bottom B. In this case, threading of a thread having a thread bottom B with a predetermined depth can be carried out by repeating the movement of the tool 3 along the round-up path P while gradually increasing the cutting depth D along the cutting path pa.

In the embodiment described above, the return path for moving the tool 3 along the axial direction and in the direction away from the main spindle 2 in order to perform the next turning process is made different from each other in the sub-path p4 . . . sub-path pn, for the sake of convenience.

In practice, however, it is preferred that the return path of the tool 3 in the sub-path p4 . . . sub-path pn is set at the same height.

In the embodiment described above, the round-up paths pb in the sub-paths p1 to pn have the same inclination angle. However, the inclination angle of the round-up paths pb in the sub-paths p1 to pn may be different from each other. For example, in the final stage of the threading process, the inclination angle of the round-up path pb may be gradually increased, so as to form a complete thread up to the base side portion of the workpiece W close to the main spindle 2. Further, amid the round-up step in one sub-path, the inclination angle may be changed (for example, the inclination angle is alternately increased and decreased). In this case, the chips can be broken amid rounding-up to further shorten the chips.

In the embodiment described above, the axial positions of the sub-paths p1 to pn are sequentially shifted such that the axial position for starting rounding-up of the workpiece W is located between the axial position where the rounding-up of the workpiece W has been started in the previous turning process and the axial position where the rounding-up of the workpiece W has been completed. However, the axial positions of the sub-paths p1 to pn may be sequentially shifted such that the axial position for starting rounding-up of the workpiece W is located closer to the main spindle 2 than the axial position where the rounding-up of the workpiece W has been completed in the previous turning process.

REFERENCE SIGNS

1 Threading device
2 Main spindle
3 Tool
4 Control unit
5 Drive mechanism
W Workpiece
C Rotation center axis
D Cutting depth
P Tool path
p1 Sub path
p2 Sub path
p3 Sub path
p4 Sub path
pn Sub path
pa Cutting path
pb Round-up path
B Thread bottom
L Axial length of the round-up path

The invention claimed is:

1. A threading device for forming a thread groove in a workpiece, comprising a spindle for rotatably supporting the workpiece, and a controller for controlling a relative movement of a tool with respect to the workpiece, wherein the controller controls the movement of the workpiece and the tool in accordance with a predetermined turning step:

wherein the turning step is carried out by relatively moving the tool in an axial direction of the workpiece to subject the rotating workpiece to cutting with a predetermined cutting depth, and then relatively moving the tool in the axial direction and radially outward to subject the workpiece to rounding-up obliquely; and wherein the controller controls the turning step to be carried out repeatedly at the predetermined cutting depth, while sequentially shifting an axial position for starting the rounding-up of the workpiece relative to an axial position where the rounding-up has been started in a previous turning step, thereby forming a thread groove in the workpiece.

2. The threading apparatus according to claim 1, wherein the predetermined cutting depth of the tool with respect to the workpiece is a depth that corresponds to a thread bottom of a thread to be formed in the workpiece.

3. The threading apparatus according to claim 1, wherein a deburring process is carried out after the thread groove has been formed in the workpiece, in which at least a part of a top of a first thread in the workpiece is cut by the tool.

4. The threading apparatus according to claim 3, wherein the deburring step is defined to be carried out by relatively moving the tool in the axial direction of the workpiece to cut the top of the thread in the rotating workpiece with a predetermined cutting depth and then relatively moving the tool in the axial direction and radially outward to subject the top of the thread to cutting obliquely, and wherein the controller controls the deburring step to be carried out repeatedly, while sequentially shifting an axial position for starting the cutting of the top of the thread in the workpiece relative to an axial position where the cutting of the top of the thread was started in a previous deburring step, thereby cutting at least a part of a top of the thread in the workpiece.

5. The threading apparatus according to claim 2, wherein a deburring process is carried out after the thread groove has been formed in the workpiece, in which at least a part of a top of a first thread in the workpiece is cut by the tool.

6. The threading apparatus according to claim 5, wherein the deburring step is defined to be carried out by relatively moving the tool in the axial direction of the workpiece to cut the top of the thread in the rotating workpiece with a predetermined cutting depth and then relatively moving the tool in the axial direction and radially outward to subject the top of the thread to cutting obliquely, and wherein the controller controls the deburring step to be carried out repeatedly, while sequentially shifting an axial position for starting the cutting of the top of the thread in the workpiece relative to an axial position where the cutting of the top of the thread was started in a previous deburring step, thereby cutting at least a part of a top of the thread in the workpiece.

* * * * *